J. T. WALTERS.
CHURN.
APPLICATION FILED NOV. 21, 1910.
993,130. Patented May 23, 1911.
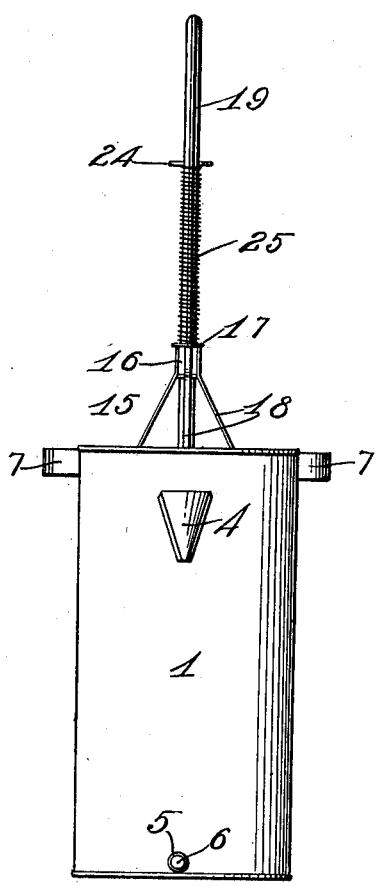
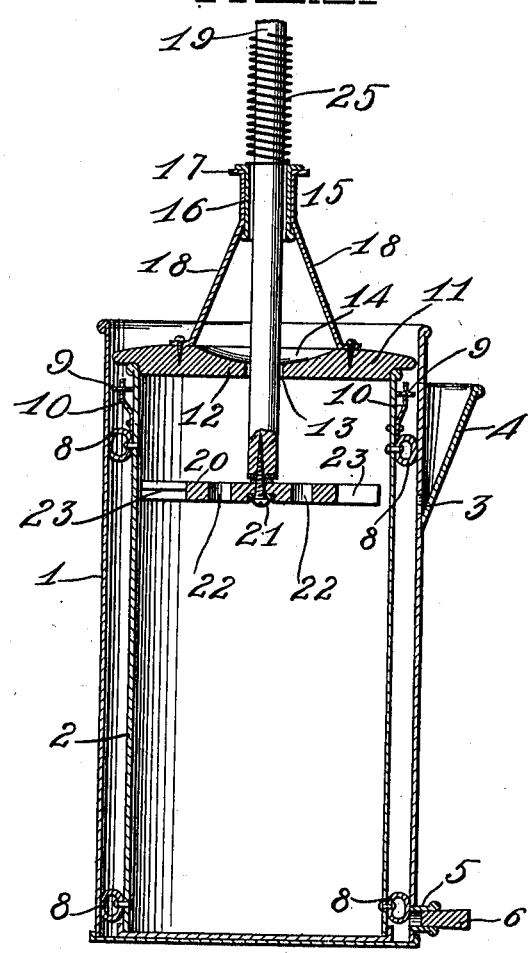
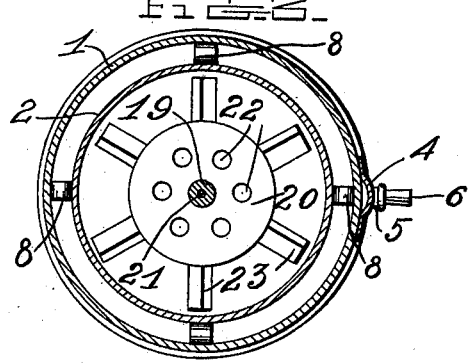
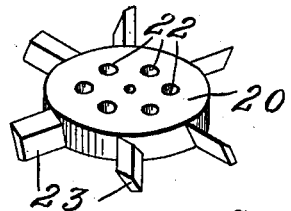
Witnesses
J. R. Pierce
L. O. Hilton
Inventor
J. T. Walters.
by H. B. Willson & Co.
Attorneys

UNITED STATES PATENT OFFICE.

JOHN TAYLOR WALTERS, OF EAST RADFORD, VIRGINIA.

CHURN.

993,130. Specification of Letters Patent. Patented May 23, 1911.

Application filed November 21, 1910. Serial No. 593,439.

*To all whom it may concern:*

Be it known that I, JOHN TAYLOR WALTERS, a citizen of the United States, residing at East Radford, in the county of Montgomery and State of Virginia, have invented certain new and useful Improvements in Churns; and I do declare the following to be a full, clear, and exact description of the invention, such as will enable others skilled in the art to which it appertains to make and use the same.

This invention relates to improvements in churns.

One object of the invention is to provide a churn having an improved double body in the outer receptacle of which is adapted to be placed hot or cold water whereby the proper temperature is imparted to the milk or cream in the inner receptacle thus obviating the necessity of placing either hot or cold water directly into the milk or cream.

Another object is to provide an improved construction and arrangement of dasher supporting and retracting mechanism.

With the foregoing and other objects in view, the invention consists of certain novel features of construction, combination and arrangement of parts as will be more fully described and particularly pointed out in the appended claims.

In the accompanying drawings: Figure 1 is a side view of a churn constructed in accordance with my invention; Fig. 2 is a central vertical section of the same; Fig. 3 is a horizontal section taken above the dasher; Fig. 4 is a detail view of the dasher removed from the churn.

Referring more particularly to the drawings, 1 denotes the outer body or receptacle of the churn and 2 denotes the inner receptacle. The receptacles 1 and 2 may be of any suitable size and shape and are here shown as being cylindrical. The outer body or receptacle has formed in one side near its upper end a water inlet passage 3 over which is arranged a flared mouth piece or funnel 4 whereby hot or cold water may be poured into the space between the inner and outer receptacles for the purpose of controlling the temperature of the milk or cream in the inner receptacle. In the outer receptacle or body 1 is also formed near its lower end a discharge spout 5 which is normally closed by a suitable plug or stopper 6 and through which the water is drawn from the outer receptacle. The outer receptacle is also preferably provided near its upper end with suitable handles 7 whereby the churn may be readily lifted and carried.

The inner receptacle 2 is in the form of a cylindrical can the diameter of which is such that the required space will be provided between the inner and outer receptacles to receive the water as described. The inner receptacle 2 is provided at diametrically opposite points near its upper and lower ends with spacing members 8 which are here shown in the form of rings which are soldered or otherwise secured to the outer sides of the receptacle. When the inner receptacle is placed in the outer receptacle the spacing members 8 engage the inner walls of the outer member and thus hold the inner receptacle in a central position in the outer receptacle. The inner receptacle 2 is also provided with a suitable handle, which is preferably in the form of a bail 9 having its ends engaged with apertured ears 10 secured to the opposite sides of the receptacle below the upper end thereof as shown. When in an inoperative position the bail 9 is adapted to swing down into the space between the inner and outer receptacles and to rest upon one of the spacing members 8 whereby said bail will be in an out of the way position but may be readily reached when desired to remove the inner receptacle from the outer receptacle. The inner receptacle is somewhat shorter than the outer receptacle and the upper end of the inner receptacle is thus disposed a short distance below the upper end of the outer receptacle. The receptacles 1 and 2 are preferably formed of sheet metal but may be formed of any suitable material.

The upper end of the receptacles 1 and 2 are closed by a suitable cover 11 which is preferably formed of wood and is of such size as to fit closely into the upper end of the outer receptacle and to engage and rest on the upper end of the inner receptacle. On the under side of the cover is formed a centrally disposed annular extension 12 which is adapted to fit snugly into and tightly close the upper end of the inner receptacle. In the cover is formed a centrally disposed passage 13 through which the dasher rod is adapted to reciprocate. In the upper side of the cover around the passage 13 is formed a circular depression 14 which serves to catch any milk or cream drawn or splashed up through the passage 13 by the movement of the dasher rod whereby said milk or cream is caused to run back into the churn.

Arranged on the cover 11 is a dasher rod guiding and bracing frame 15 comprising a guide tube 16 having on its upper end an annular flange 17. The tube 16 is secured to the cover and supported a suitable distance above the same and in line with the passage 13 therein by a series of inclined brace bars 18 having their upper ends rigidly secured to the tube in any suitable manner and their lower ends secured to the cover as shown. Slidably mounted in the passage 13 and tube 16 is a dasher rod 19 having on its lower end a dasher 20. The dasher 20 is preferably revolubly mounted on the lower end of the dasher rod on a stud bolt or pivot screw 21 arranged therein as shown. The dasher comprises a circular block or disk having formed therein an annular series of vertically disposed passages 22 through which the milk or cream passes when the dasher is reciprocated. On the outer edge of the dasher is arranged a series of radially projecting wings or blades 23 which are preferably arranged at an angle and beveled on their upper edges whereby when the dasher is reciprocated, said inclined blades in passing through the milk or cream impart a rotary motion to the dasher thereby thoroughly agitating the milk or cream. The dasher rod 19 projects upwardly a suitable distance above the tube 16 and on said upwardly projecting portion of the rod between the tube 16 and a cotter pin or other form of stop 24 secured to the dasher rod is arranged a coiled dasher retracting spring 25 whereby when the dasher is depressed or pushed into the churn said spring will aid or assist the retracting or outward movement of the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a churn, the combination of concentric cylindrical receptacles, a cover fitting snugly in the inner receptacle and closing both receptacles, a plurality of converging braces rising from the cover, a vertically disposed sleeve carried by the upper ends of said braces, and a dasher rod slidably mounted in said sleeve and the cover.

2. In a churn, the combination of concentric inner and outer cylindrical receptacles, rings secured to the inner receptacle at the upper and lower ends of the same and bearing against the outer receptacle to hold the inner receptacle steady in spaced relation to the outer receptacle, ears secured to the inner receptacle above the upper rings, and a bail engaging said ears and adapted to lie between the two receptacles.

In testimony whereof I have hereunto set my hand in presence of two subscribing witnesses.

JOHN TAYLOR WALTERS.

Witnesses:
R. S. CECIL,
M. H. GALWAY.

---

Copies of this patent may be obtained for five cents each, by addressing the "Commissioner of Patents, Washington, D. C."